(12) United States Patent
Nespor et al.

(10) Patent No.: US 10,812,876 B2
(45) Date of Patent: Oct. 20, 2020

(54) RADIO-FREQUENCY IDENTIFIER TUNABLE BY DIELECTRIC INSERTS

(71) Applicant: VYSOKE UCENI TECHNICKE V BRNE, Brno (CZ)

(72) Inventors: Dusan Nespor, Podivin (CZ); Pavel Fiala, Bilovice nad Svitavou (CZ)

(73) Assignee: VYSOKE UCENI TECHNICKE V BRNE, Brno (CZ)

( * ) Notice: Subject to any disclaimer, the term of this patent is extended or adjusted under 35 U.S.C. 154(b) by 0 days.

(21) Appl. No.: 16/320,322

(22) PCT Filed: Jul. 24, 2017

(86) PCT No.: PCT/CZ2017/000048
§ 371 (c)(1),
(2) Date: Jan. 24, 2019

(87) PCT Pub. No.: WO2018/019314
PCT Pub. Date: Feb. 1, 2018

(65) Prior Publication Data
US 2019/0246185 A1    Aug. 8, 2019

(30) Foreign Application Priority Data
Jul. 25, 2016  (CZ) .............................. PV 2016-452

(51) Int. Cl.
*G06K 7/10*  (2006.01)
*H04Q 1/02*  (2006.01)
*G06K 19/07*  (2006.01)

(52) U.S. Cl.
CPC .............. *H04Q 1/138* (2013.01); *G06K 7/10* (2013.01); *G06K 7/10712* (2013.01); *G06K 19/0728* (2013.01); *H04Q 1/13* (2013.01)

(58) Field of Classification Search
CPC .............. G06K 7/00; G06K 7/08; G06K 7/081
(Continued)

(56) References Cited

U.S. PATENT DOCUMENTS 7,471,199 B2    12/2008  Zimmerman et al.
10,063,104 B2 *  8/2018  Kurs ........................ H03H 7/40
(Continued)

FOREIGN PATENT DOCUMENTS

DE    4338554 A1    5/1994
EP    1251588 A2    10/2002
(Continued)

OTHER PUBLICATIONS

International Search Report dated Dec. 14, 2017 for International Application No. PCT/CZ2017/000048 filed Jul. 24, 2017.

*Primary Examiner* — Daniel St Cyr
(74) *Attorney, Agent, or Firm* — Blue Filament Law PLLC

(57) ABSTRACT

A radio-frequency identifier tunable by dielectric inserts (3), includes a fixed part (92) and a key (9), the fixed part (92) of includes an indication element (91) and a decoding device (8), which includes an electrical supply unit (84), an evaluation and control unit (83), a decoding device (82) and a control element (81), herein the decoding device (8) is connected to a receiver (7), which includes an antenna (71), an input amplifier (72) and a block (73) of filters and circuits. The decoding device (8) is further connected with a receiver (6), which includes an antenna (61), an output amplifier (63) and a signal generator (62). The key (9) includes at least one carrier (32) connected with at least one insert (3) having at least one additional dielectric block (20) modified on its surface or at least one opening (200) formed inside the insert (3). The dielectric block (20) includes an additional dielectric block (21).

11 Claims, 15 Drawing Sheets

(58) Field of Classification Search
USPC .................. 235/454, 492, 462.46, 472.02
See application file for complete search history.

(56) References Cited

U.S. PATENT DOCUMENTS

| | | | |
|---|---|---|---|
| 2004/0135675 A1* | 7/2004 | Thiesen | G06K 19/0675 |
| | | | 340/10.1 |
| 2005/0280539 A1 | 12/2005 | Pettus | |
| 2006/0180647 A1 | 8/2006 | Hansen | |
| 2006/0226948 A1 | 10/2006 | Wright et al. | |
| 2007/0153565 A1* | 7/2007 | Nomura | B82Y 10/00 |
| | | | 365/148 |
| 2007/0241904 A1 | 10/2007 | Ozaki et al. | |
| 2010/0134254 A1 | 6/2010 | Kim | |

FOREIGN PATENT DOCUMENTS

| | | |
|---|---|---|
| EP | 1811432 A1 | 7/2007 |
| EP | 2495805 A1 | 9/2012 |
| EP | 2286485 B1 | 8/2016 |
| FR | 2992758 A1 | 1/2014 |
| WO | 9410663 A1 | 5/1994 |
| WO | 2014040576 A2 | 3/2014 |
| WO | 2015004232 A1 | 1/2015 |

* cited by examiner

RADIO-FREQUENCY IDENTIFIER TUNABLE BY DIELECTRIC INSERTS

FIELD OF INVENTION

The invention relates to a radio-frequency identifier tunable by dielectric inserts, using radiofrequency identification (RFID), which uses resonance structures as a coding medium and is tunable by means of dielectric inserts.

STATE OF THE ART

In present, two basic concepts are used for radio frequency identification on in safety and security systems. A passive one and an active one. In case of the passive one, the transmitter transmits electromagnetic pulses periodically into surroundings. If passive RFID device appears nearby, it uses received energy to charge its power supply, triggers the device and sends the answer. The passive devices may transmit either one number (electronic number of EPC product) assigned during their production, or they have additional memory, into which additional information may be written and read. Active RFIDs are more complex and more demanding in terms of production, as they comprise their own power supply, and they can transmit their own identification—therefore, they are used for active localization/identification. Besides its identification number, the active RFID devices usually have space for additional information, which (on a signal similar to identification command) may be saved or sent together with the identification number.

The U.S. Pat. No. 7,471,199 B2 discloses a mobile key comprising a RFID tag associated with a memory. A secure access code is saved in the memory. Authorization status for a person or item associated with the mobile key is determined by interrogating the mobile key using an RFID interrogation field. Security information, such as a secure identifier access codes, physical measurement data, or biometric data may be provided by the mobile key. The key may also comprise a wireless communication device, such as a telephone, by means of which security information from the mobile key may be provided.

The US patent application no. US 20060226948 A1 discloses an electronic lock assembly including a transponder. The key is inserted into the electronic lock assembly through an opening, in which the electronic assembly is arranged. The electronic assembly comprises a coil assembly powered by a switch engaging with the key. Subsequently, the coil assembly generates a magnetic field, which activates the transponder. The transponder transmits the signal received by a controller. The controller controls the key assembly depending on the received signal, wherein it moves the locking member into unlocked position. The key provides energy for unlocking the latch and therefore no additional power supply is needed for controlling the motor. The key assembly, its controller and transponder, are powered by small amount of electricity and may thus be used as a power supply as well as a commercially available battery.

A reader and RFID tag distance measuring system are disclosed in the US patent application no. US 2007241904. RFID tag and the whole distance measuring system comprises a reader, which supplies a pre-determined carrier signal to a tag and receives a reflected signal of the carrier signal from the RFID tag. The reader comprises a signal output means for output of signals at multiple frequencies, which are different from each other (such as carrier and transmitting signals). The signal output means transmits the signal on the signal output to the tag in the receiving section, which receives the reflected signals at multiple frequencies, wherein these signals are different from each other. Measurement of distance between the tag and the reader depends on the number of phase changes between the reflected signals, received by the receiving section, and carrier signals and their frequencies. Transmitting and receiving sections have two pairs of transmit and receive antennas, which can receive multiple signals, in which the strength of reflected signal differs, received by the receive antenna.

Device for detecting of electrical circuit switching described in the US patent application no. US 2006/0180647 A1 comprises a RFID tag, a conductive loop and a switch connected to the conductive loop, creating a control circuit. The switch is controlled so as to provide the on and off state, which causes closing or opening of the control circuit. The RFID tag detects the state of the conductive circuit of the loop and transmits a signal representing the on/off state into the RFID reader. The device for detecting of electrical circuit switching is integrated in the on/off switching mechanism. The device for detecting of electrical circuit switching comprising a lever assembly, latch lock assembly, window wing lock assembly, tachometer wheel, a hinge provided with a first joint member and a second joint member connected by a central axle, door closer and a rotatable switch or rotatable lock.

The patent application no. US2010134254 describes a chip-less RFID system, comprising a tag and a reader. The tag may comprise metamaterial having at least two resonance frequencies. The reader may change the frequencies of the first electromagnetic wave transmitted to the tag. Subsequently, the reader reads and identifies the tag by means of the second electromagnetic wave transmitted from the tag, corresponding with the first electromagnetic wave. The identification method of the chip-less RFID system comprises a step of creating a tag having metamaterial with various resonance frequencies. The frequency of the first electromagnetic wave to be transmitted by the reader to the tag is then changed, and subsequently, the frequency spectrum of the second electromagnetic wave corresponding to the first electromagnetic wave is analyzed. A drawback of such system is that it uses properties of metamaterials, which are difficult to produce. Another drawback is that the system uses 100% periodicity of the metamaterial structure, which makes this structure predictable and may be easily reproduced by a third party, thus not acquiring the required safety of the key-lock system.

RF tagging system with resonant circuits is disclosed in the international patent application no. WO9410663. The tagging principle is as follows: when the tag enters the detection zone, resonance frequencies of each resonant circuit are determined and a corresponding code is produced. Detection of resonance frequency is performed simultaneously with radiation signals at each possible resonance frequency for tagging circuits. The radiated signals are phase-shifted during the detection process and the signal received by the receiving antennas, except for the transmitting signals, may be tracked in order to improve reliability of the resonant circuits detection. Antenna beams may be used for radiation of signals into the detection zone, so that each position of the resonant circuit on the tag could be tracked independently.

Method for tuning of dielectric antennas designed for operation, especially in the microwave range, and the antennas are described in the European patent application no. EP1251588. The antenna is tuned by removing material from dielectric block arranged between conductive elements, increasing the resonance frequency of the antenna. Conductive elements on the opposing surfaces of the dielectric block are shaped identically and are located symmetrically, so that tuning of the antenna would not affect other electric properties of the antenna, but the resonance frequency. An advantage of such invention is that the method according to the invention allows more precise tuning of the antenna, as removal of small amount of metamaterial from the dielectric medium only slightly changes the resonance frequency of the antenna.

The European patent application no. EP 2495805 describes radio-frequency tag identifier comprising an RFID chip, an antenna and a feed line, electrically coupling the RFID chip with the antenna. A code reader (EIR—"encoded information reading") comprises a microprocessor and a memory communicatively coupled to the microprocessor. The RFID reading device may further comprise an antenna and a feed line. RFID tag antenna or RFID reading device may be made of metamaterial (MTM), such as artificial composite materials engineered to produce desired electromagnetic behavior. MTM antenna can be sized, for example, on the order of one tenths of a signal's wavelength.

Method for manufacturing a communication device to operate in near field and communication device thereof is disclosed in the international patent application no. WO2015004232. The communication device comprises a metamaterial guiding structure and at least on feed point. The method comprises exciting the communication device by means of the feed point using transmission of electromagnetic energy, subsequent controlling the values of wavenumber by modifying the metamaterial guiding structure, and calculation of imaginary value of transversal component (ky) of the wavenumber in free space (K) so that the electromagnetic field of modified metamaterial guiding structure is enclosed around the said metamaterial guiding structure.

A solution described in patent application no. DE4338554 is related to a method for electronic identification of items using passive resonators by means of electromagnetic fields and connection for implementing the said method. The solution is that n switchable resonators with associated detection frequency and burn-out frequency are designed as a matrix, and n resonators are contactlessly encoded from n frequencies by connecting to electromagnetic fields. Connection of n switchable resonators arranged in a matrix flatly and/or in multiple layers. These resonators consist of connection o fat least one detection resonator with at least one burn-out resonator.

The French patent application no. FR2992758 describes radio-frequency identification system with chip-less radio-frequency identification tag comprising a conductive pattern created on a dielectric pad, defined resonators and a reading device transmitting linearly polarized reading signal in the required direction and the method for RFID tag reading. The system comprises a chip-less reader for identification of high frequencies (RFID) comprising a conductive pattern formed on a dielectric pad. The conducive pattern determines resonators, wherein each resonator receives linearly polarized signal in one direction and repeatedly transmits a part of the signal polarized in direction other direction separate from the first direction. The reading device transmits linearly polarized reading signal in the first direction and at the same time receives linearly polarized signal in the second direction.

Drawbacks of the above described technical solutions are characterized in that they use properties of metamaterials, which are difficult to produce, as well as 100% periodicity of metamaterial structure, working on the basis of known and pre-defined resonance frequency, making the structure predictable and easily reproducible by a third party.

Photovoltaic system comprising an elementary resonator for use in power plant engineering is described in Czech patent application no. PV 2012-636. A solar element comprises the elementary resonator arranged in dielectric structure consisting of an area with minimum electromagnetic attenuation, the upper part of which forms an impact plane, and the area with minimum electromagnetic attenuation is transparent in relation to falling electromagnetic wave, while being limited by material properties changes. At least one 2D-3D resonator is surrounded by a dielectric and is arranged in a dielectric structure. At least one more area with different resonance frequency of the elementary resonator follows the area with minimum electromagnetic attenuation. The system either terminates into free space or is terminated with a solar element (system) to fully absorb the remaining energy of the falling electromagnetic wave.

Drawback of state of the art are characterized in low adaptability—changes in code while preserving the safety level, unavailability of technologies and speed of change of the code for the most common users—households.

SUMMARY OF THE INVENTION

The aim of the invention is to provide a radio-frequency identifier tunable by inserts made of dielectric material, which uses radio-frequency identification (RFID) on radio frequency (RF), which allows coding of information using simple exchangeable inserts in combination with periodic structure of resonators, conceived, for example, on the basis of metamaterial structures or resonance structures, periodic or multiplayer structures, and periodic structures with 100% periodicity or partial periodicity.

The above mentioned object is achieved by an arrangement of radio-frequency identifier tunable by dielectric inserts, using radio-frequency identification, and comprising a fixed part and a key, where the fixed part comprises an indicating element and a decoding device, which comprises an electrical power unit, evaluation and control unit, a decoding device and a control element, wherein the decoding device is connected with a receiver comprising an antenna, input amplifier and a block of filters and shaping circuits, wherein the decoding device is further coupled to a transmitter, which comprises an antenna, input amplifier and a signal generator, wherein the key comprises at least on carrier coupled with at least one insert provided with at least one additional dielectric block adapted on the insert's surface or at least one opening formed inside the insert, characterized in that the dielectric block consists of the additional dielectric block, having a circular shape in its cross-section, or the additional dielectric block having a square shape in its cross-section, or the additional dielectric block having an oval shape in its cross-section, or the additional dielectric block having a rectangular shape in its cross-section, or the additional dielectric block having a shape of n-walls with optional wall ratio for n=4, 5, 6, . . . 20, wherein these additional blocks with various shapes may be combined and the opening has a circular shape in its cross-section, or the opening has a square shape in its cross-section, or the opening has an oval shape in its cross-section, or the opening has a rectangular shape in its cross-section, or the opening has a shape of n-walls with optional aspect ratio for n=4, 5, 6, . . . 20, wherein variously shaped openings may be combined.

The invention is based on using resonance properties of periodic structure of electromagnetically bound resonators, and on the change of structure periodicity measure in relation to falling electromagnetic wave, on structure resonance and on interference of the resulting electromagnetic wave of the whole structure. The present invention uses the above mentioned to obtain easily repeatedly producible devices with a clear electromagnetic wave response, which is used as identification of a device—a key for radio-frequency identification system.

An advantage is that such arrangement of radio-frequency identifier does not use already known principles of radio-frequency identification, such as those known in access systems—signal reception, signal processing and a response forwarding a code to the interrogation device. The present arrangement, merely with its structure, forms a device which can be clearly identified by means of radio-frequency and which does not need electrical circuits for signal reception, processing and coding the signal back to be sent to the external reading device. The change of code is made very easily, by replacing/changing the shape of insert made of dielectric material.

The advantage of the present solution is also the fact that the matrix of elementary resonators in the present solution is integral part of the RFID device, particularly part of the key composition based on periodic structure properties of resonators in electromagnetic field, represented by an electromagnetic wave of the structure, being identical for the set of solutions, and only by changing the insert made of dielectric material it is possible to easily change the response of the electromagnetic wave of the key on the impact of the electromagnetic wave, and thus identification of the evaluated key structure in the evaluation/decoding device is differentiated.

BRIEF DESCRIPTION OF DRAWINGS

The radio-frequency identifier tunable by dielectric inserts will be further described by means of the attached drawings, where the FIG. 1 illustrates a periodic structure of resonators arranged in a matrix in interaction with electromagnetic wave in the impact area, the FIG. 2a illustrates periodic structures of resonators arranged in two matrixes opposite each other, the FIG. 2b illustrates a two-sided variant of the periodic structure of elementary resonators arranged in a matrix, the FIG. 2c illustrates a combination of two-sided and two one-sided periodic structure arranged in matrixes, the FIG. 3 illustrates the arrangement of the fixed part of radio-frequency identifier and the key with the bond to the secured element, the FIG. 4 illustrates a geometric dimension of the carrier with the arrangement of resonators forming a matrix together, the FIG. 5 illustrates an exemplary shapes of elementary resonators, the FIG. 6a illustrates exemplary shapes of elementary resonators with their basic dimensions, the FIG. 6b illustrates exemplary shapes of an elementary resonator in spatial view, the FIG. 7 illustrates exemplary embodiment of a periodic structure of resonators with indicated spacing dimensions of elementary resonators forming a matrix arranged on a carrier, the FIG. 8a illustrates basic shape of the block and the opening, with which the insert may be provided, the FIG. 8b illustrates exemplary shape of blocks and openings intended for insert modification, the FIG. 9 illustrates an exemplary arrangement of blocks of the radio-frequency identifier tunable by dielectric inserts with the arrangement of transmission, reception and evaluation/decoding device for two-sided arrangement of the matrix in the key, the FIG. 10 illustrates exemplary arrangement of the blocks of radio-frequency identifier tunable by dielectric inserts with the arrangement of transmission, reception and evaluation/decoding device for one-sided arrangement of the carrier with the insert in the key, the FIG. 11 illustrates an exemplary arrangement of the blocks of radio-frequency identifier tunable by dielectric inserts with the arrangement of transmission, reception and evaluation/decoding device for two one-sided arrangements of the carrier with the insert in the key, the FIG. 12 illustrates an exemplary arrangements of the blocks of radio-frequency identifier tunable by dielectric inserts with the arrangement of transmission, reception and evaluation/decoding device for two two-sided arrangements of the carrier with the insert in the key and the FIG. 13 illustrates an exemplary arrangements of the keys of the radio-frequency identifier tunable by dielectric inserts, which are arranged in the carrier.

DESCRIPTION OF EXEMPLARY EMBODIMENTS

Figure 1:
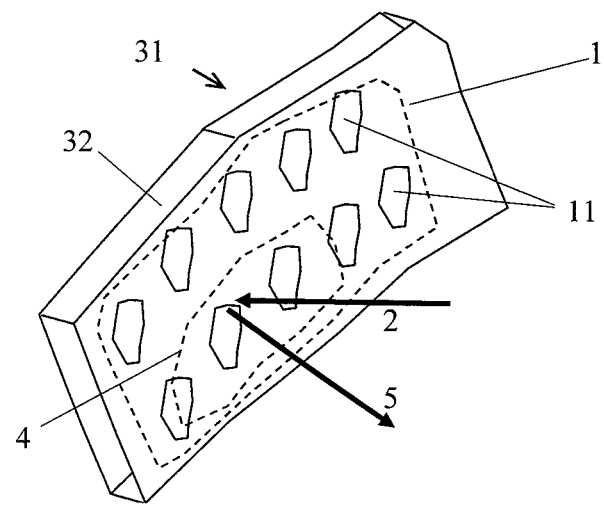
Figure 1:
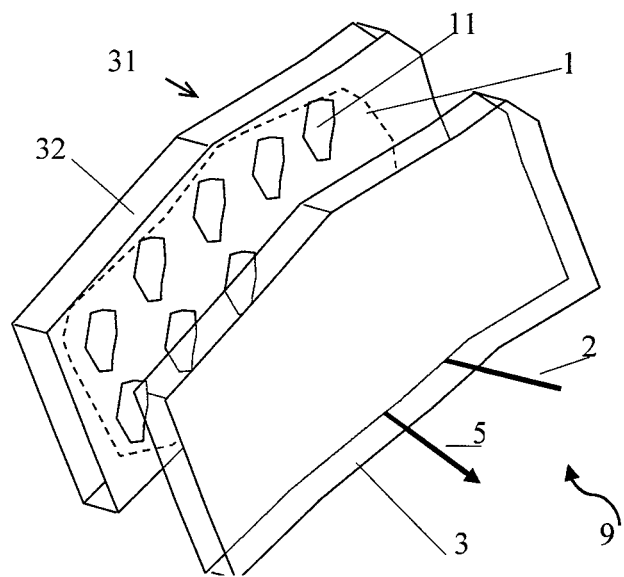

The invention will be described by means of the following description of exemplary embodiments of the radio-frequency identifier with reference to respective drawings. In the drawings, the invention is illustrated by means of exemplary embodiments of the particular parts, elements and combinations thereof, describing the arrangement of the radio-frequency identifier tunable by dielectric inserts.

Figure 3:
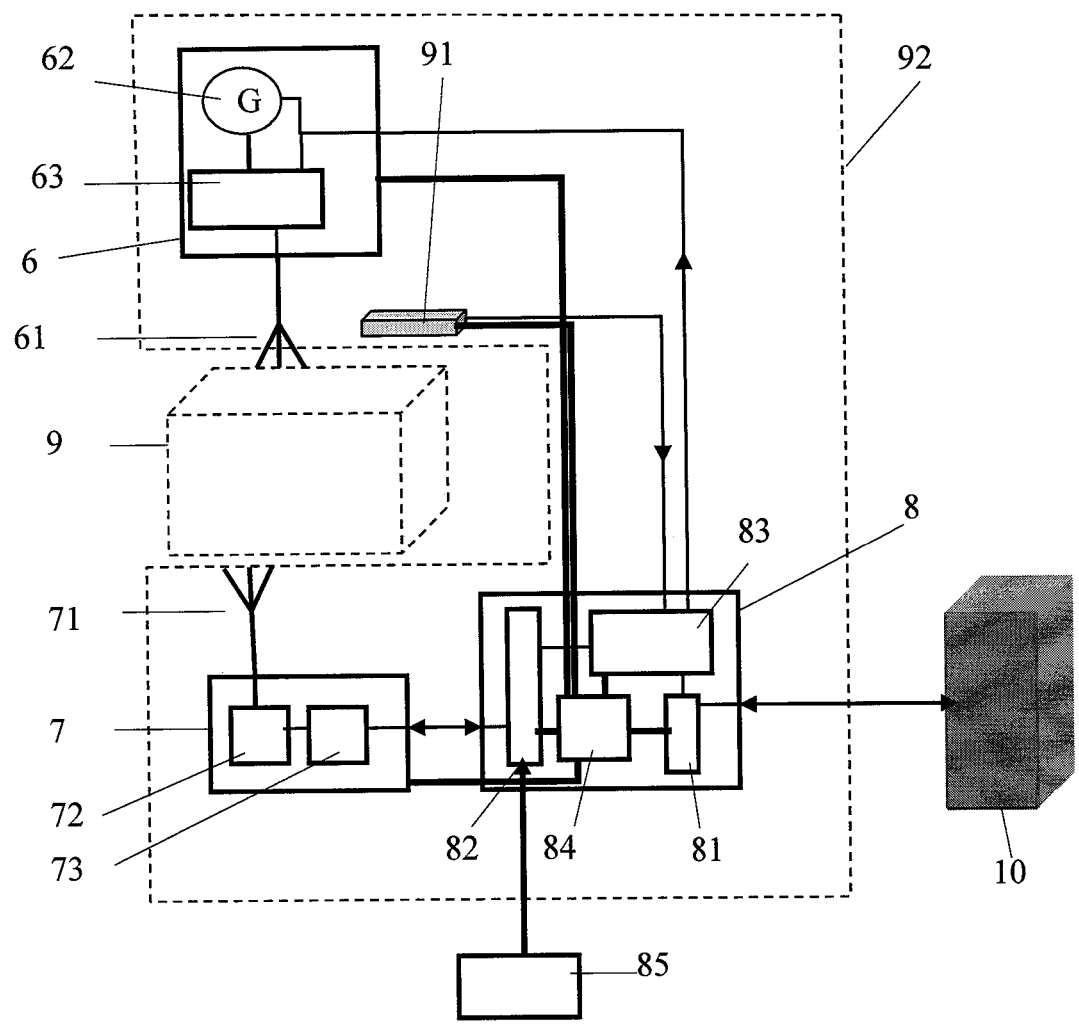

An exemplary embodiment of the radio-frequency identifier is shown in the FIG. 3. In this embodiment, the radio-frequency identifier comprises a fixed part 92 and a key 9 controlling the secured element 10, wherein these two components form the key assembly. In this embodiment, the fixed part 92 comprises an indication element 91, a block 8 of the evaluation/decoding device, which comprises an electrical energy unit 84, evaluation and control unit 83, a decoding device 82 and a control element 81. The block 8 of the evaluation/decoding device is coupled to a receiver 7, which comprises an antenna 71, an input amplifier 72 and a block 73 of filters and shaping circuits. Further, the block 8 of the evaluation/decoding device is connected with the transmitter 6 comprising an antenna 61, an output amplifier 63 and a signal generator 62. The decoding device 8 is further connected with a code setting block 85 in the fixed part 92.

The radio-frequency identifier functions as follows. Upon insertion of a correct key 9 the fixed part 92 by means of indication of status via the indication element 91, the indication element will send information about the status, i.e. presence of a key 9, to the block 8 of the evaluation/decoding device. The status is evaluated in the evaluation and control unit 83 and the control and evaluation unit 83 sends a signal for initiation of an electromagnetic wave 2 from the transmitter 6, which using the signal generator 62 and the output amplifier 63 and the transmission element, i.e. the antenna 62, initiates the transmission of the electromagnetic wave 2 by transmitting the electromagnetic 2 in the range of tuned periodic structure 1. The frequency range $f_r$ of the transmitted electromagnetic wave is specific and depends on dimensions and arrangement of elementary resonators 11 and further on electromagnetic properties of the carrier 32 as well as electromagnetic properties of the material of the insert 3, which is relative permittivity r. At the same time, the frequency range $f_r$ moves in the range of $f_r$=1 MHz-1000 THz and these ranges will be closer specified for particular exemplary embodiments using the technology and the dimensional categories of the lock key 9. The method of transmission of the electromagnetic wave 2 is realized by means of the signal generator 62, the output amplifier 63 as well as the transmission element—the antenna 61 of the transmitter 6. The generated signal has the frequency of $f_v$ and may show repeatedly frequency-swept harmonics or it may have a rectangular shape in the time interval, or a shape of a saw or a triangle, or short narrow impulse, or combinations thereof in repeat mode. The repetition of the generated signal is temporally separated by a time interval $t_{del}$, which reaches values ranging from 1 microsecond to several seconds. The electromagnetic wave 2 transmitted in this manner spreads through the area near the transmission element—the antenna 61—and falls on the matrix 31 in the impact area 4 of the electromagnetic wave 2. The electromagnetic wave 2 initiates the reflected electromagnetic wave 5 in the periodic structure 1 arranged on the carrier 32 connected with the insert 3. The reflected electromagnetic wave 5 is transmitted to the receiving element—the antenna 71, which transforms it and the wave in the form of a signal is further amplified by the input amplifier 72 and modified into a processable form in the block 73 of filters and shaping circuits. The signal modified in this way is forwarded to the block 8 of the evaluation/decoding device. In case information resulting from such processed signal corresponds with the pre-set information in the form of a code in the decoding device 82, a command to ensure that the secured/controlled element 10 is given by means of the evaluation and control unit 83 and the control element 81.

Evaluation and decoding of the signal at the output of the block 73 of filters and of the shaping circuit entering the decoding device 82 may be performed by means of the code setting block 85 using several methods.

When generating the signal using the signal generator 62 with repeatedly swept harmonic waveform with the frequency $f_v$ in the frequency range $f_r$, resonance spectrum of the signal coming from the filter block 73 and the shaping circuit of the receiver 7 is recorded in the decoding device 82. The recorded spectrum is compared to the saved values of the required spectrum. If there is a match in case of multiple comparisons of both spectrums, the information about the match of the code set in the code setting block 85 and the code obtained from the key 9 is forwarded. Further, the information about the code match is forwarded to the evaluation and control unit 83, which evaluates it and gives command to the control element 81 to release the secured element 10. The evaluation and control unit 83 sets other system elements into the status of successful signal evaluation. In case there is not match detected during multiple comparisons of both spectrums, the information about different code setting in the code setting block 85 and the code evaluated by means of inserting the key 9 into the fixed part of the radio-identification device 92 is forwarded to the evaluation and control unit 83. The evaluation and control unit 83 sets the other system elements to the status of unsuccessful signal evaluation and further to the mode of identification of another key 9.

During generation of a signal in the signal generator 62 in a time interval, having a rectangular shape or a shape of a saw, a triangle, a short narrow impulse or combinations thereof, in the repeat mode, with the frequency of $f_v$ in the frequency range $f_r$, evaluation of the resonance spectrum of the signal coming from the filter block 73 and the shaping circuit of the receiver 7 is performed in the decoding device 82 using known mathematical methods/tools, such as Fourier transform, fast Fourier transform, and the like. The recorded spectrum is compared with the saved values of the required spectrum. In case there is a match detected during multiple comparisons of both spectrums, the information about the match between the code set in the code setting block 85 and the code obtained from the key 9 is forwarded. Further, the information about the match is received by the evaluation and control unit 83, which evaluates the information and gives command to the control element 81 to release the secured element 10. The evaluation and control unit 83 set the other system elements into the status of successful signal evaluation. If there is no match detected during multiple comparisons of both spectrums, the information about different code setting in the code setting block 85 and the setting of the code evaluated by inserting the key 9 into the fixed part 92 of the radio frequency device is forwarded to the evaluation and control unit 83. The evaluation and control unit 83 sets the other system elements to the status of unsuccessful signal evaluation and further to the mode of identifying another key 9.

Figure 9:
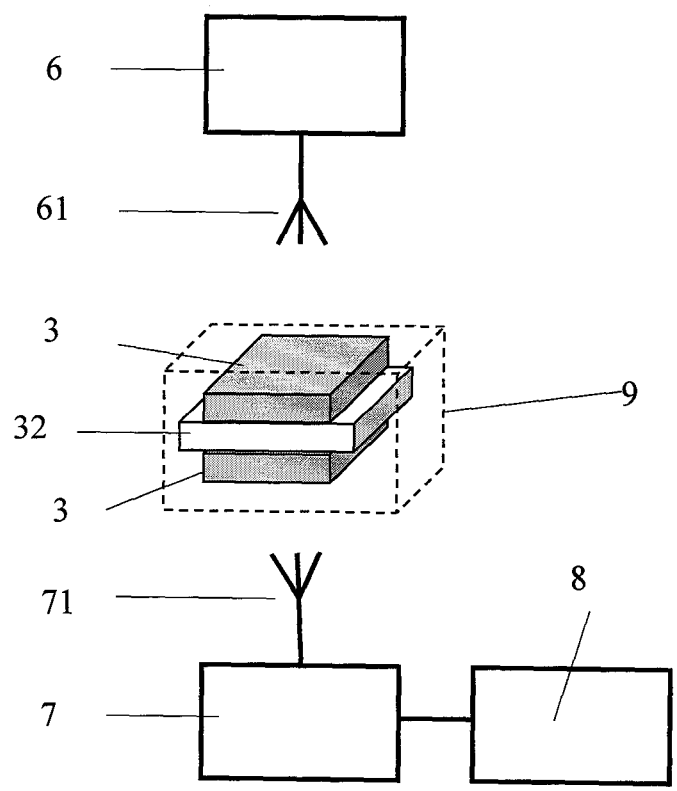
Figure 13:
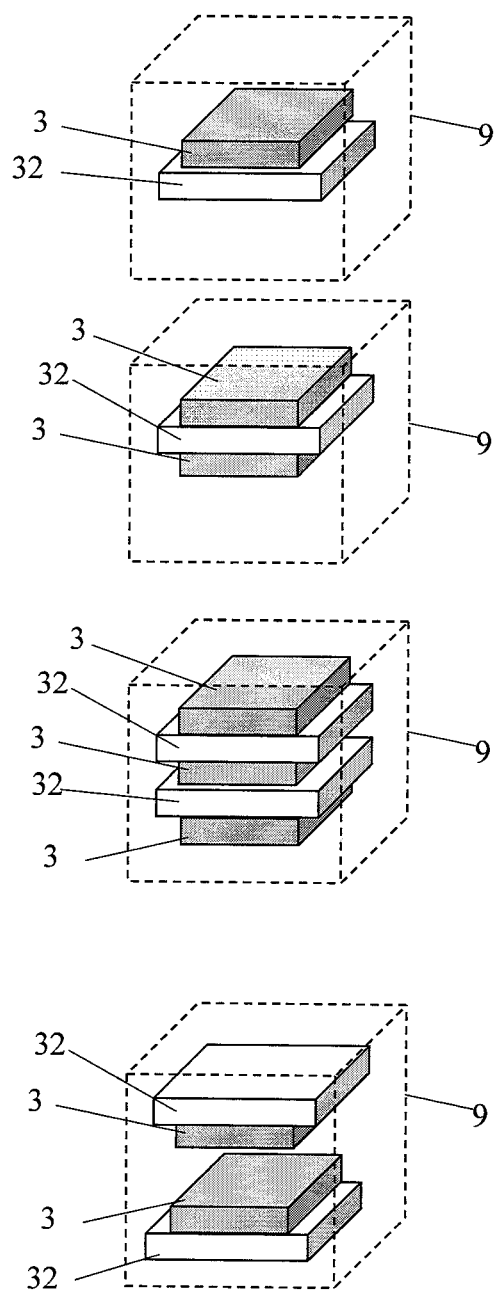

In the basic embodiment, the key 9 consists of the carrier 32, which is provided by at least two elementary resonators 11 arranged in a periodic structure 1, and the insert 3. The insert 3 is provided with at least one dielectric block 20 or at least one shaped opening 200 or combinations thereof. The insert 3 is adjacent to the carrier 32 on one of its sides or on both sides. Other embodiments of the key 9 may be combined by means of the above-described carrier 32 and the insert 3, as it is apparent from the FIG. 13. Other exemplary embodiment of the radio-frequency identifier, in which the key 9 comprises the carrier 32 with the inserts 3 adjacent from the both sides, is illustrated in the FIG. 9. Such arrangement comprises the transmitter 6 together with the antenna 61, the key 9, the receiver 7 with the antenna 71, connected to the evaluation/decoding device 8.

Figure 10:
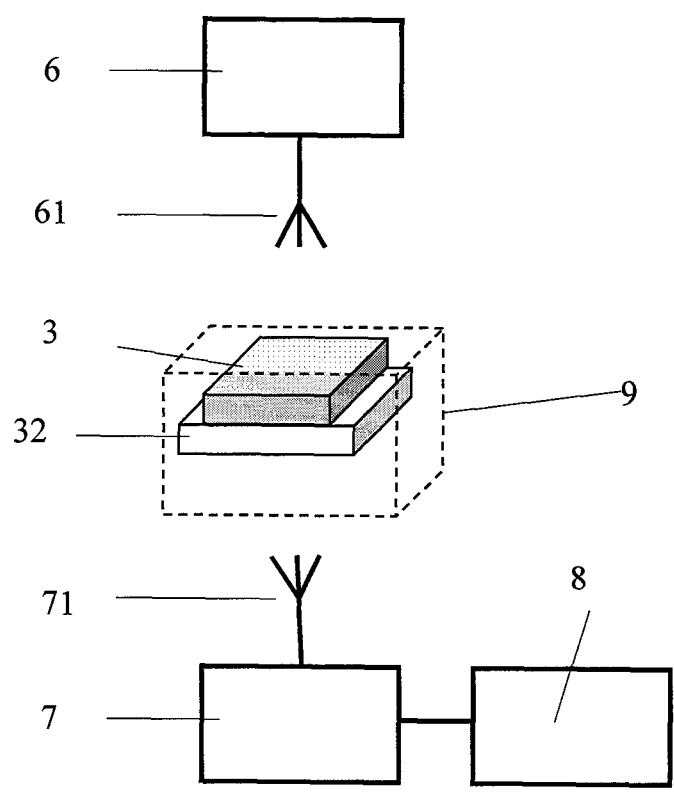

Another exemplary embodiment of the radio-frequency identifier, in which the key 9 comprises the carrier 32, with the insert 3 adjacent on one side, is illustrated in the FIG. 10. Such arrangement comprises the transmitter 6 together with the antenna 61, the key 9, the receiver 7 with the antenna 71, connected to the evaluation/decoding device 8.

Figure 11:
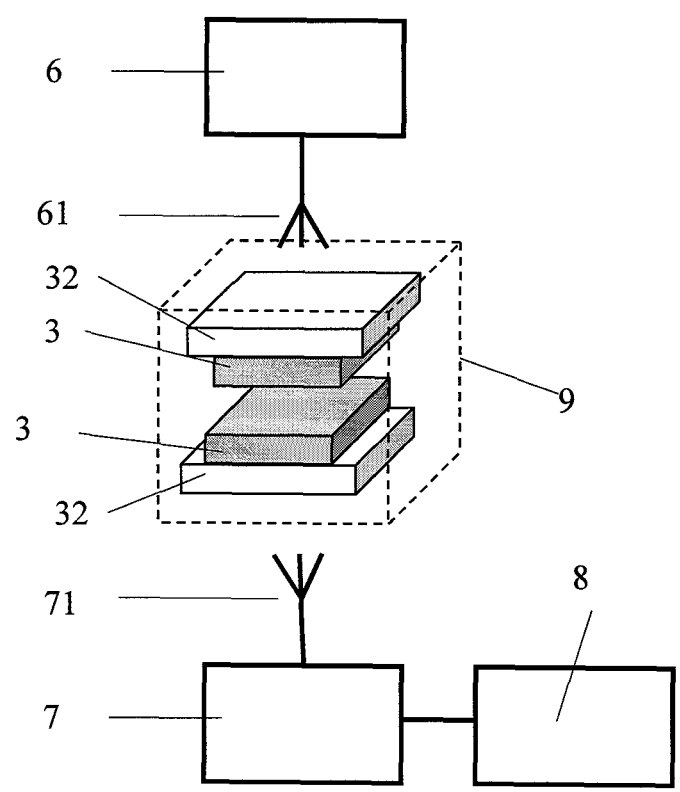

Another exemplary embodiment of the radio-frequency identifier, in which the key 9 comprises two one-sided embodiments of the carrier 32, with the insert 3 adjacent on one of its sides, wherein in this embodiment two carriers 32 with the inserts 3 facing each other are used, is illustrated in the FIG. 11. Such arrangement comprises the transmitter 6 together with the antenna 61, the key 9, the receiver 7 with the antenna 71, connected to the evaluation/decoding device 8.

Figure 12:
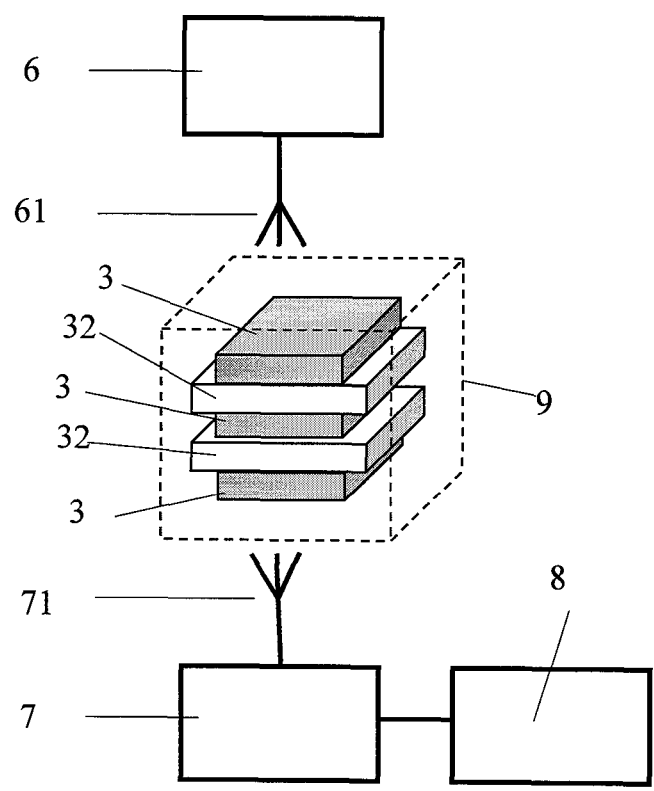

Another exemplary embodiment of the radio-frequency identifier, in which the key 9 comprises the carrier 32, with the inserts 3 adjacent to it from both sides, and the carrier 32 with the insert 3 adjacent from one side, while the free side of the first carrier 32 adjoins the insert 3 of the other carrier 32, is illustrated in the FIG. 12. Such arrangement comprises the transmitter 6 together with the antenna 61, the key 9, the receiver 7 with the antenna 71, connected with the evaluation/decoding device 8.

Resonance structures arranged in the periodic structure 1 are designed as the matrix 31. The matrix 31 consists of elementary resonators 11 arranged together and provided on the carrier 21 made of dielectric material. Such material may be synthetic polymer, natural polymer or available dielectric materials, it may further be ceramic material, semiconductor substrates based on Si, Ge, As and other materials known in the field of semiconductor techniques.

Figure 7:
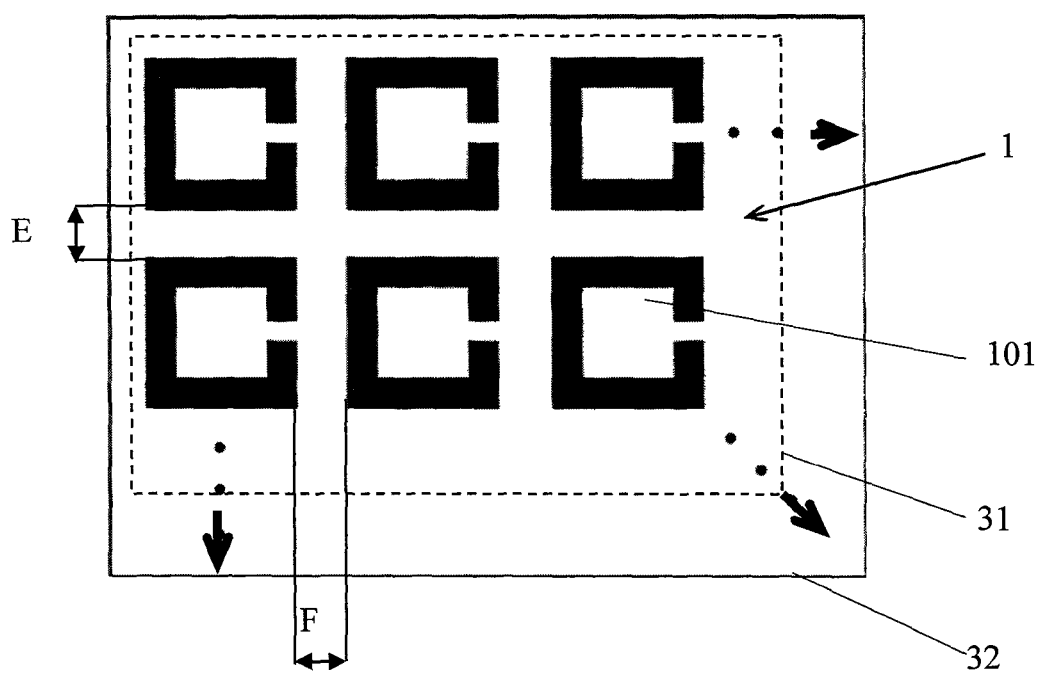

The FIG. 1 illustrates a scheme of the arrangement of one-sided variant of the matrix 31, which consists of the carrier 32 with the elementary resonators 11, which are arranged in the periodic structure 1, wherein the periodic structure 1 interacts with the electromagnetic wave 1 in the impact area 4 and forms the reflected electromagnetic wave 5. In the exemplary embodiment, the matrix 31 consists of the carrier 32, on which the periodic structure 1 of elementary resonators 101 is arranged, wherein these elementary resonators 101 form a periodic structure 1 spatially or in a plane, as it is apparent from the FIG. 7.

Figure 2A:
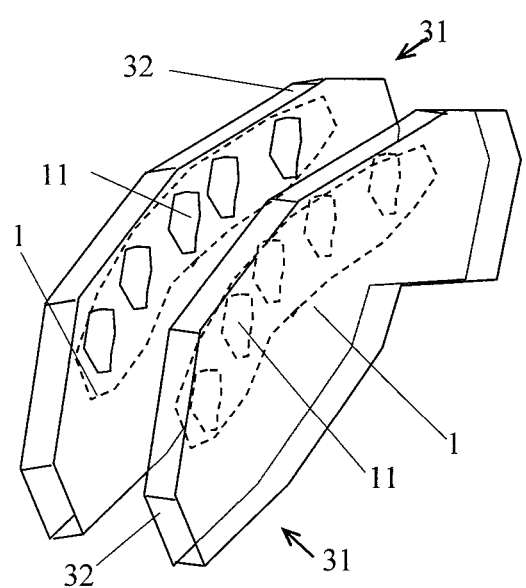

The FIG. 2a illustrates two one-sided variants of the matrix 31, in which the elementary resonators 11 are arranged opposite each other on the carrier 32 of the periodic structure 1. Such arrangement is advantageous for increasing the number of setting combinations of the resulting codes, known as code strength.

Figure 2B:
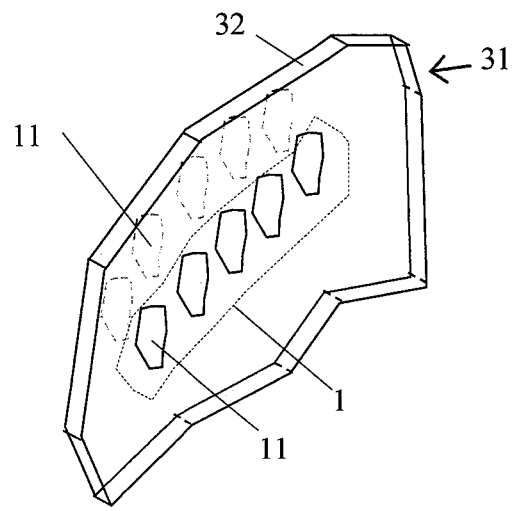

The FIG. 2b illustrates two-sides variant of the matrix 31, where one carrier 32 is provided with periodic structures 1 with elementary resonators 11 on both sides. Such arrangement is advantageous for increasing the multiple number of setting combinations of the resulting codes, known as code strength.

Figure 2C:
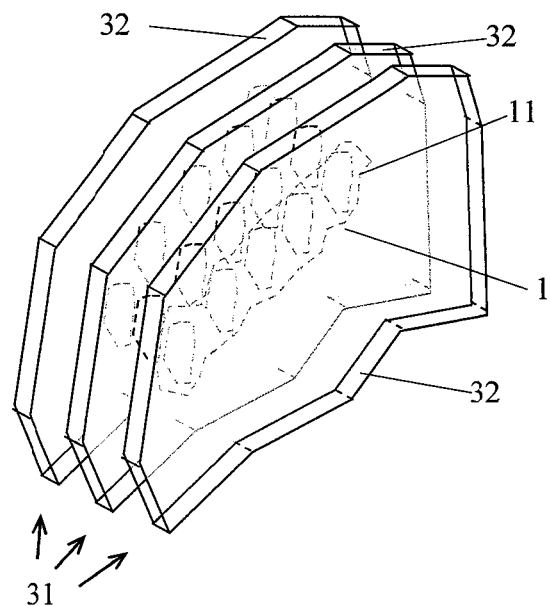

The FIG. 2c illustrates a combination of a two-sided variant and two one-sided variants of the matrix 31, which are provided with periodic structures 1 with elementary resonators 11 on the carriers 32. Such arrangement is advantageous for increasing the number of setting combinations of the resulting codes, known as code strength, however, this combination is also more resistant to unwanted eavesdropping of the communication between the key 9 and the fixed part 92.

Figure 5:
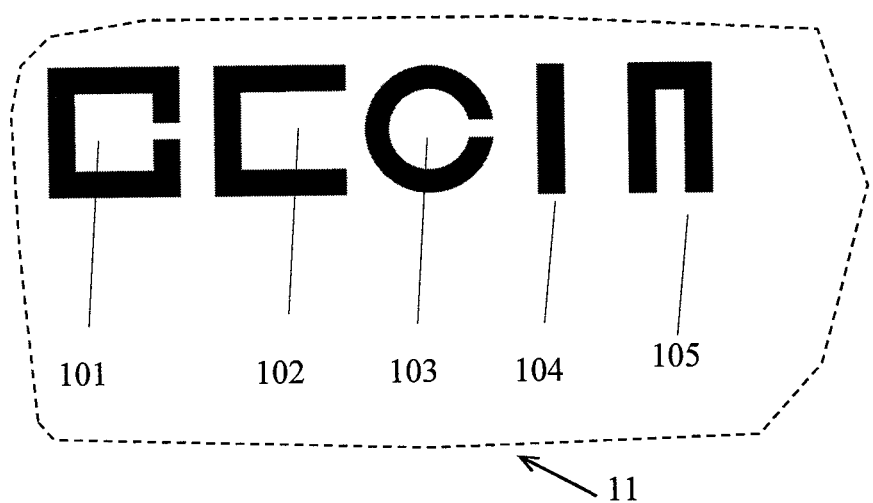
Figure 6A:
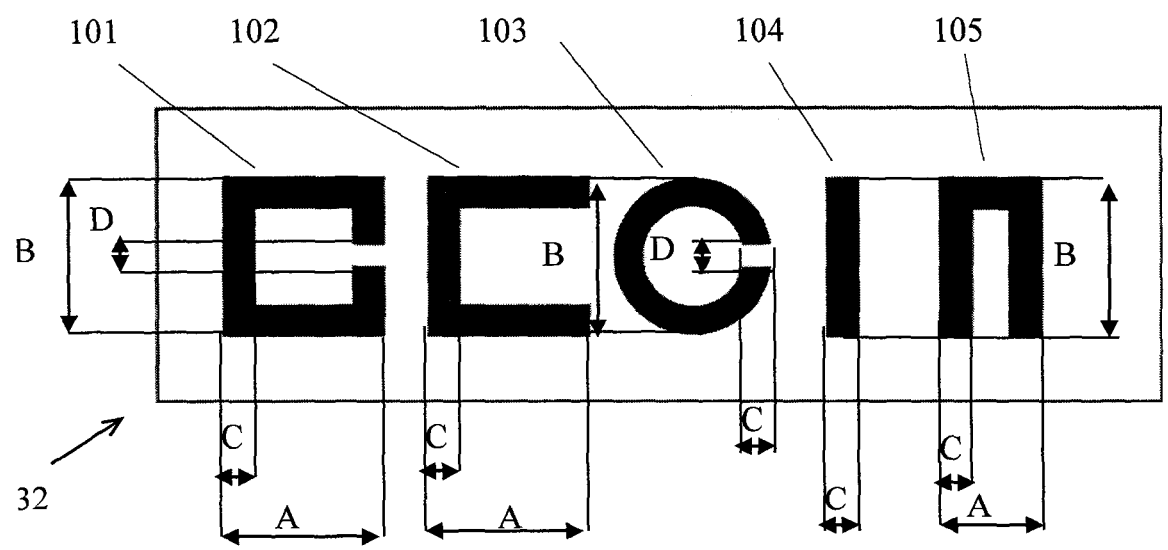
Figure 6B:
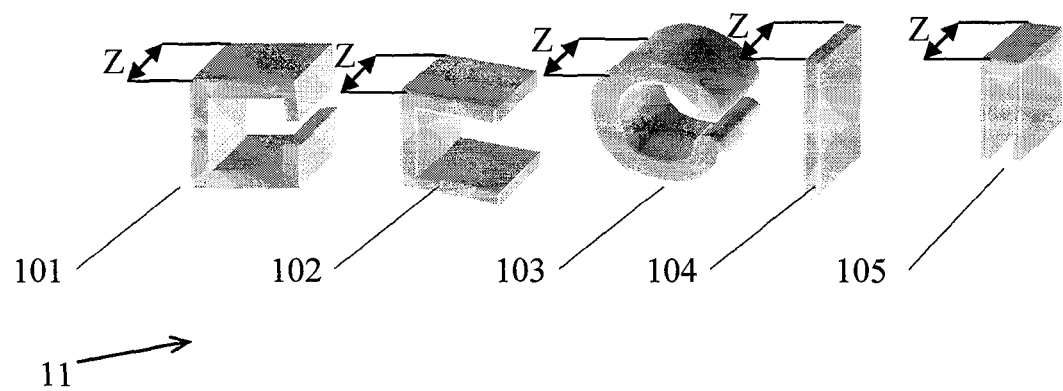

The elementary resonators 11 are produced as divided square, annular or dipole structures, or eventually their combinations, such as a CC-type resonator 101, LL-type resonator 102, C-type resonator 103, I-type resonators 104, U-type resonators 105 and other shapes of resulting from various combinations or divisions of the said shapes, as it is illustrated in the FIG. 5. The elementary resonator 11 may also consist from, for example, straight broken or divided conductors or other combinations of shapes of the said elementary geometric arrangements of conductors, and these are provided on the carrier 32, which is a part of the matrix 31.

The elementary resonators 11 may be tuned to their own operating frequency $f_r$ by means of their geometry, mutual arrangement of the conductor geometry, properties of the carrier 32, such as its electric permittivity $\varepsilon_s$, magnetic permeability $\mu_s$, electrical conductivity $\gamma_s$, electrical permittivity of the surroundings $\varepsilon_o$, magnetic permeability of the surroundings $\mu_o$, electrical conductivity of the surroundings $\gamma_o$, electrical conductivity of the conductors $\gamma_v$ of the elementary resonator 11, and mutual electromagnetic-physical bonds between elementary resonators 11 (known as the capacity $C_v$, inductance $L_v$, conductivity $G_v$). Near the matrix 31 and periodic structure 1 of the resonators 11 arranged on the carrier 32, the insert 3 made of dielectric material with specific geometry and properties of the electric permittivity $\varepsilon_d$, magnetic permeability $\mu_d$, electrical conductivity $\gamma_d$ of dielectric material is arranged, and this connection allows tuning of the required periodic structure 1 of elementary resonators 11 to the required frequency $f_s$, and the electromagnetic structure created in this way forms a unique response of the reflected electromagnetic wave 5 detected by the receiver 7 provided with the receiving element—the antenna 71, upon impact of the electromagnetic wave 2 transmitted by the transmitter 6 using transmission element 61 by, which is hardly achievable by any other means.

The degree and strength of the code created by the response information of the reflected electromagnetic wave 5 in the impact area 4 of the electromagnetic wave 2 on the signal transmitted by the transmitter 6 by means of the transmission element—the antenna 61, depends on the number and type of combinations of elementary resonators 11, and on their mutual tuning to the operating frequency $f_s$.

The periodic structure 1 may be formed, for example, by means of the CC-type resonator 101, LL-type resonator 102, C-type resonator 103, I-type resonator 104, U-type resonator 105 and combinations thereof. The arranged elementary resonators 11 form the matrix 31 provided on the carrier 32. Electromagnetic property of the carrier 32 also depends on the electric permittivity $\varepsilon_s$ of the material of the carrier 32 magnetic permeability $\mu_s$ of the material of the carrier 32, electrical conductivity $\gamma_s$ of the material of the carrier 32, permittivity $\varepsilon_s$ of the material of the carrier 32, electrical permittivity $\varepsilon_0$ of the surroundings of the carrier 32, magnetic permeability $\mu_o$ of the surroundings of the carrier 32, electrical conductivity $\gamma_o$ of the surroundings of the carrier 32, and electrical conductivity $\gamma_v$ of the conductors of the elementary resonator 11.

Figure 4:
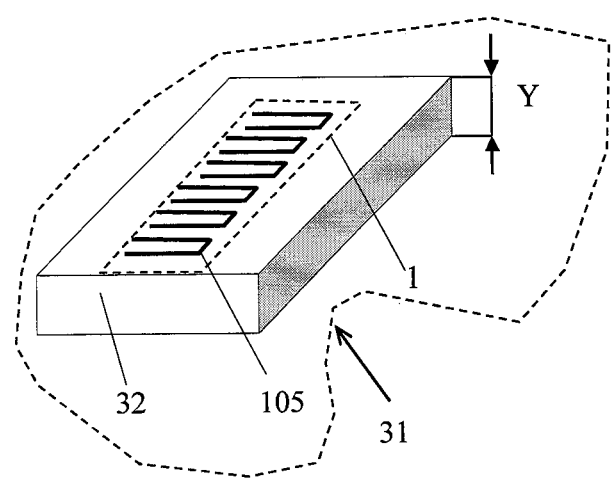

The FIG. 4 illustrates an example of the matrix 31, in which U-type resonators 105 are used, arranged on the carrier 32, having an Y-width of its geometric dimension.

Depending on the type of the used production technology, dimensions of elementary resonators 11 vary in the range of cm to nm, wherein their specific dimensions are illustrated in the FIGS. 6a, 6b, 7 and 8a.

Dimensions of the elementary resonators 11, dimensions of the periodic structure 1 of the resonators, dimensions of the arrangement of the elementary resonators 11 in the matrix 31 on the substrate 32, dimensions of the additional dielectric block 20, shaped circuit 200 and the insert 3 made of dielectric material for various application of the present invention may be categorized into the following ranges:

Ranges of nanometer order, particularly dimensions in the intervals of A=1000 nm-10000 nm, B=1000 nm-10000 nm, C=100 nm-1000 nm, D=100 nm-1000 nm, E=100 nm-5000 nm, F=100 nm-5000 nm, G=200 nm-5000 nm, H=100 nm-1000 nm, I=100 nm-1000 nm, X=100 nm-100000 nm, Y=100 nm-100000 nm, Z=1 nm-1000 nm, ranges of micrometer order, particularly dimensions in the intervals of A=10 μm-100 μm, B=10 μm-100 μm, C=1 μm-10 μm, D=1 μm-10 μm, E=1 μm-500 μm, F=1 μm-500 μm, G=2 μm-500 μm, H=1 μm-10 μm, I=1 μm-10 μm, X=0.1 μm-1000 μm, Y=0.1 μm-1000 μm, Z=0.01 μm-10 μm, ranges of millimeter order, particularly dimensions in the intervals of A=1 mm-10 mm, B=1 mm-10 mm, C=0.1 mm-1 mm, D=0.1 mm-1 mm, E=0.1 mm-50 mm, F=0.1 mm-50 mm, G=0.2 mm-50 mm, H=0.1 mm-1 mm, I=0.1 mm-1 mm, X=0.1 mm-100 mm, Y=0.1 mm-100 mm, Z=0.01 mm-1 mm, ranges of centimeter order, particularly dimensions in the intervals of A=1 cm-10 cm, B=1 cm-10 cm, C=0.1 cm-1 cm, D=0.1 cm-1 cm, E=0.1 cm-50 cm, F=0.1 cm-50 cm, G=0.2 cm-50 cm, H=0.1 cm-1 cm, I=0.1 cm-1 cm, X=0.1 cm-10 cm, Y=0.1 cm-10 cm, Z=0.1 mm-10 mm.

The additional dielectric blocks 20 are made of, for example, plastic material based on polymers, as microscopic as Si, Ge, As, and others, as well as of nanoscopic structures such as Ag, Zn, Ni, Co and others, and they may be produced using available 3D print, lithographic technologies, steaming, stamping, and other, and the shaped openings 200 may be formed using classic machining techniques, material removal techniques, as well as using 3D print technologies together with burning, etching, grinding, abrasive processing, compressed air and waterjet processing, and other methods, when producing the insert 3 made of dielectric material.

An advantage of the present solution and the concept of the radio-frequency identifier is that the period structure 1 of elementary resonators 11 arranged on the carrier 32 together with the insert 3 made of dielectric material form the key 9. Upon transmission of the electromagnetic wave 2 by the transmitter 6 using the transmission element, i.e. the antenna 61, its impact on the impact area 4 forms the reflected electromagnetic wave 5, which is detected by means of the receiving element, i.e. the antenna 71, and forwarded to the receiver 7. The key 9 based on this coding method can be easily modified and produced, replicated or modified, using 2D/3D printing technology as well as other technologies. These changes are characterized in changing the motive, structure or material of the insert 3 made of dielectric material. The insert 3 may be provided with the dielectric block 20 arranged on its surface or shaped openings 200 may be formed in it, as it is apparent from the FIG. 8a. The additional dielectric block 20 may consist of the additional dielectric block 21 having a circular shape in its cross-section, or the additional dielectric block 22 having a square shape in its cross-section, or the additional dielectric block 23 having an oval shape in its cross-section, or the additional dielectric block 24 having a rectangular shape in its cross-section, or the additional dielectric block 25 having a shape of n-walls in its cross-sections with optional wall ratio for n=4, 5, 6, . . . 20, wherein these additional blocks 20 may be combined for forming various shapes.

Figure 8A:
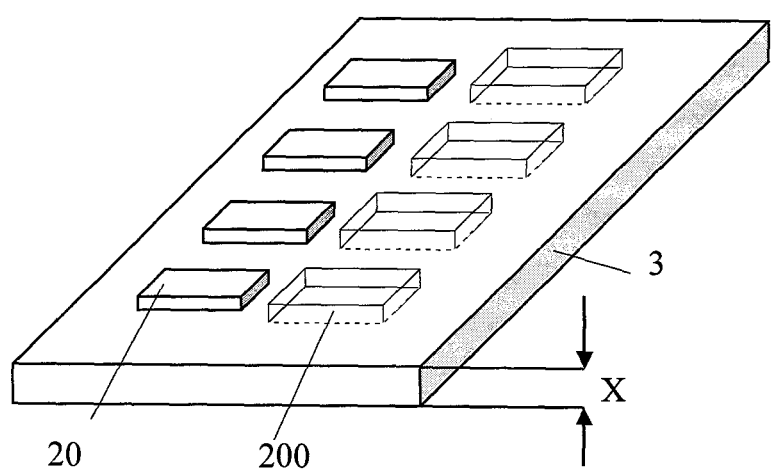
Figure 8B:
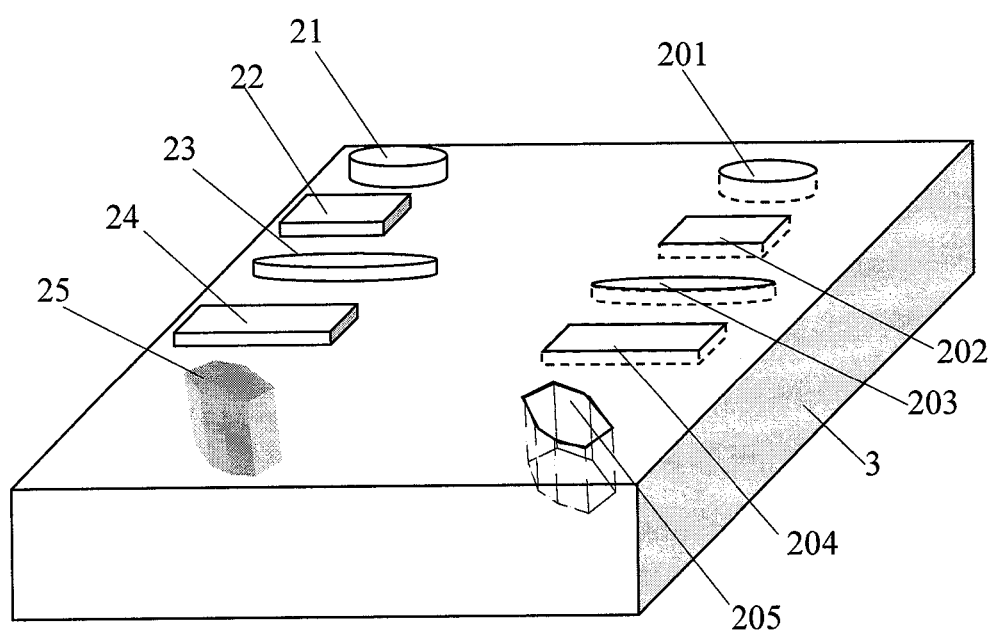

The shaped openings 200 may consist of the opening 201 having a circular shape in its cross-section, or the opening 202 having a square shape in its cross-section, or the opening 203 having an oval shape in its cross-section, or the opening 204 having a rectangular shape in its cross-section, or the opening 205 having a shape of polyhedron with n-walls in its cross-section, with optional wall ratio for n=4, 5, 6, . . . 20 and combinations thereof, and further it may consist of optional combination of the said additional dielectric blocks 20 and the shaping openings 200, as it is apparent from the FIG. 8b.

According to the suitable dimensions of the elementary resonator 11 and the chosen dimensional category of the resulting key 9, the corresponding production technology of replaceable inserts 3 made of dielectric material is chosen. Particularly, for the dimensional category in the range of nanometers a technology based on lithographic techniques, lift-off technique, spraying technique or steaming technique, etc., is suitable. For the dimensional category in the range of micrometers, it is possible to choose a technology based on chemical processes of applying and removing coatings, lithography, plasma spraying, sputtering, etching, etc. For the dimensional category in the range of millimeters, it is possible to choose a technology based on etching, grinding, sputtering, spraying, mechanical processing, steaming, applying of heat-treated polymers, plasma machining, abrasive machining, 3D printing, etc. For dimensional category in the range of centimeters it is possible to choose a technology based on mechanical applications, mechanical processing of surfaces, applications using plasma spraying, etching, abrasive machining using particles, water processing, emulsification, fluid machining technology, 3D printing, etc.

An advantage of the present solution is that by repeating the motive of the insert 3 made of dielectric material, using inexpensive available technologies as well as 2D/3D printing technologies, it is possible to repeatedly create the desired shape of the insert 3 made of dielectric material, which ensures the identical resulting response of the electromagnetic field in the form of reflected electromagnetic wave 5, confirming that identification of the overall setting of the key 9 in the evaluation/decoding device 8 is identical, or only by changing the motive of the insert 3 made of dielectric material, the matrix 31—periodic structure 1 or resonators and the elementary resonators 11—it is possible by means of inexpensive available technologies as well as 2D/3D printing technologies create such shape of the insert 3 made of dielectric material, which ensure different resulting response of the electromagnetic field in the form of reflected electromagnetic wave 5 and the identification of the overall setting of the key 9 in the evaluation/decoding device 8 is modified. By changing the shapes of geometry of the arrangement of dielectric blocks 20, or separately or simultaneously shaped openings 200, it is possible to change the identification of the RFID structure code, and thus the key 9.

INDUSTRIAL APPLICABILITY

The invention is intended for use as a new generation of RFID structures serving as a personal accession element, a key, replacement of conventional door keys, and the like. The first portion of the resonance structure will always remain identical, while the surrounding dielectric structure may be reproduced by means of 3D print or changed in case of change of code, and thus also change the RFID code. The solution appears to be very advantageous in relation to widespread usage of 3D printers.

LIST OF REFERENCE SIGNS

1—periodic structure of the resonators
11—elementary resonator
101—CC-type resonator
102—LL-type resonator
103—C-type resonator
104—I-type resonator
105—U-type resonator
2—electromagnetic wave
3—insert made of dielectric material
31—matrix
32—substrate
4—impact are of the electromagnetic wave
5—reflected electromagnetic wave
6—transmitter
61—transmission element-antenna
62—signal generator
63—output amplifier
7—receiver
71—receiving element-antenna
72—input amplifier
73—filters and shaping circuits
8—evaluation/decoding device
81—control element
82—decoding device 83—evaluation and control unit
84—electrical supply unit
85—code-setting block
9—key
91—indication element
92—fixed part of the radio-frequency identification device
10—secured/controlled element
20—additional dielectric block
21—circular base of the additional dielectric block
22—square base of the additional dielectric block
23—oval base of the additional dielectric block
24—rectangular base of the additional dielectric block
25—n-wall base of the additional dielectric block
200—shaped openings
201—circular base of the dielectric block opening
202—square base of the dielectric block opening
203—oval base of the dielectric block opening
204—rectangular base of the dielectric block opening
205—n-wall base of the dielectric block opening

The invention claimed is:

1. An arrangement of the radio-frequency identifier tunable by dielectric inserts (3), utilizing radio-frequency identification, comprising a fixed part (92) and a key (9), characterized in that the fixed part (92) comprises an indication element (91) and a decoding device (8), which comprises an electrical supply unit (84), an evaluation and control unit (83), a decoding device (82) and a control element (81), wherein the decoding device (8) is connected to a receiver (7), which comprises an antenna (71), an input amplifier (72) and a block (73) of filters and shaping circuits, wherein the decoding device (8) is further connected with a receiver (6), which comprises an antenna (61), an output amplifier (63) and a signal generator (62), wherein the key (9) comprises at least one carrier (32) connected with at least one insert (3), wherein the insert (3) is provided with at least one additional first dielectric block (20) modified on the surfaces of the insert (3) or at least one first opening (200) formed inside the insert (3).

2. The arrangement of the radio-frequency identifier according to claim 1, characterized in that the key (9) comprises a carrier (32) with an insert (3) adjacent to one of the sides thereof.

3. The arrangement of the radio-frequency identifier according to claim 1, characterized in that the key (9) comprises the carrier (32) provided with the insert (3) from both sides.

4. The arrangement of the radio-frequency identifier according to claim 1, characterized in that the key (9) comprises a set of the carrier (32), which is provided with the inserts (3) from both sides, to which the carrier (32) with the insert (3) on one of the sides thereof is connected.

5. The arrangement of the radio-frequency identifier according to claim 1, characterized in that the key (9) comprises a pair of carriers (9), wherein one of their sides is provided with the inserts (3) facing each other.

6. The arrangement of the radio-frequency identifier according to claim 1 characterized in that the carrier (32) is provided with elementary resonators (11) arranged into a periodic structure (1), wherein the carrier (32) together with the elementary resonators (11) forms a matrix (31).

7. The arrangement of the radio-frequency identifier according to claim 6, characterized in that the elementary resonators (11) are produced as divided square or annular or dipole structures.

8. The arrangement of the radio-frequency identifier according to claim 1, characterized in that the first dielectric block (20) comprises an additional second dielectric block (21) having a circular shape in the cross-section thereof, or an additional third dielectric block (22) having a square shape in the cross-section thereof, or an additional fourth dielectric block (23) having an oval shape in the cross-section thereof, or an additional fifth dielectric block (24) having a rectangular shape in the cross-section thereof, or an additional sixth dielectric block (25) having a shape of polyhedron with n-walls in the cross-section thereof, wherein these variously shaped additional dielectric blocks (20, 21, 22, 23, 24, 25) may be mutually combined.

9. The arrangement of the radio-frequency identifier according to claim 1, characterized in that the first opening (200) comprises a second opening (201) having a circular shape in the cross-section thereof, or a third opening (202) having a square shape in the cross-section thereof, or a fourth opening (203) having an oval shape in the cross-section thereof, or a fifth opening (204) having a rectangular shape in the cross section thereof, or a sixth opening (205) having a shape of polyhedron with n-walls in the cross-section thereof, wherein these variously shaped openings (200, 201, 202, 203, 204, 205) may be mutually combined.

10. The arrangement of the radio-frequency identifier according to claim 8, characterized in that the shape of the polyhedron with n-walls has n ranging from 4 to 20.

11. The arrangement of the radio-frequency identifier according to claim 9, characterized in that the shape of the polyhedron with n-walls has n ranging from 4 to 20.

* * * * *